Patented May 5, 1953

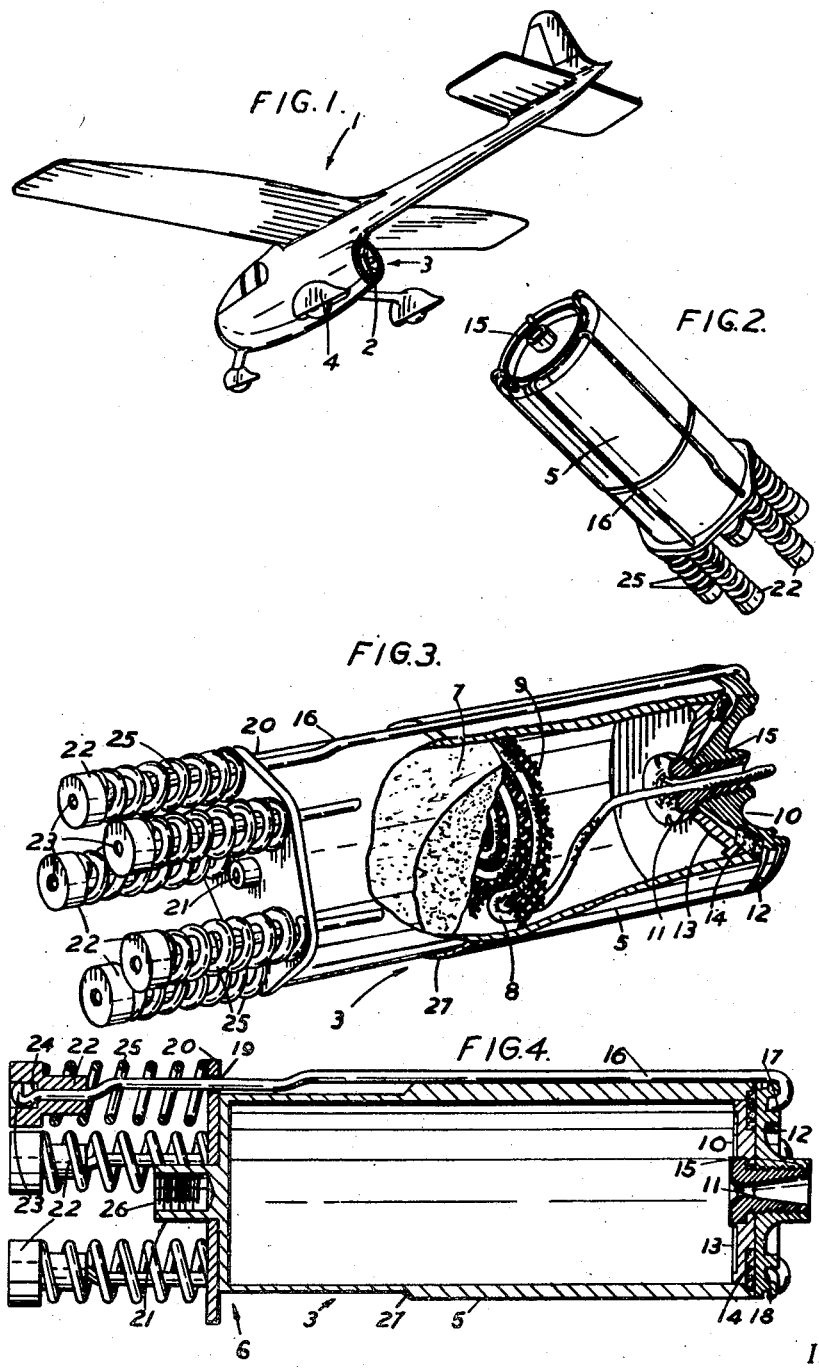

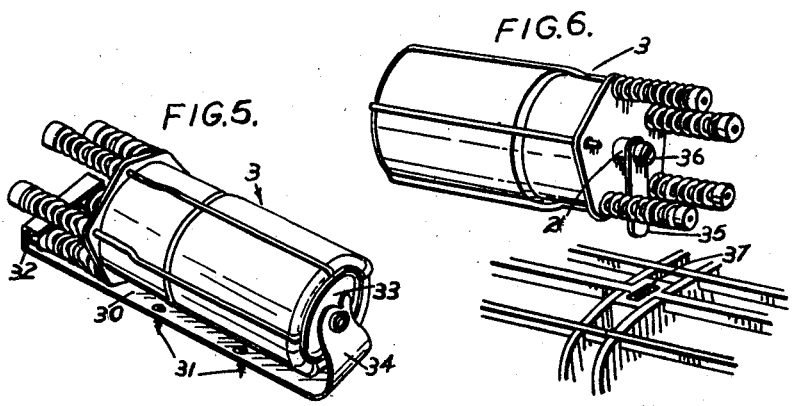
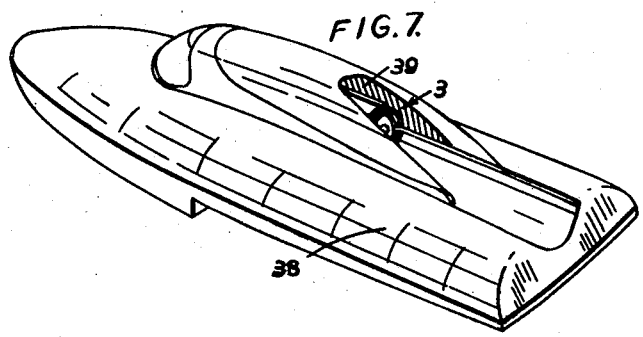
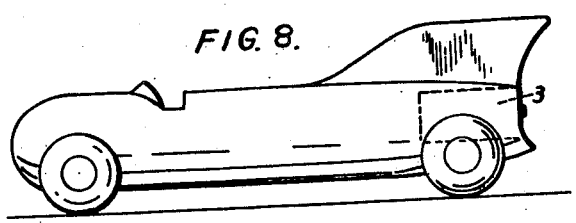
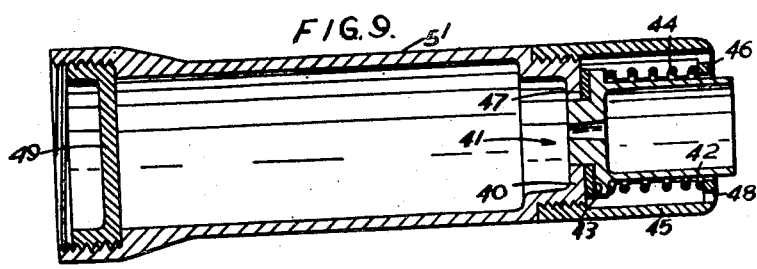

2,637,162

UNITED STATES PATENT OFFICE 2,637,162

REACTION-PROPELLED MODEL AIRPLANE, VEHICLE OR BOAT AND MOTOR THEREFOR

Charles M. Wilmot and Joseph N. Mansour, Totton, England

Application July 19, 1948, Serial No. 39,434
In Great Britain November 11, 1947

5 Claims. (Cl. 60—35.6)

This invention relates to model aircraft, vehicles and vessels and to motors for use therein.

Various experiments have been made in recent years with model aircraft driven by reaction motors of the rocket type, that is to say motors in which the forward thrust is produced by the reaction of the rearward discharge of gases of combustion. The advantages of using such a motor in a model aircraft, vehicle or vessel are obvious, the principal ones being the absence of any torque reaction in flight and the elimination of the need for winding any rubber-band motor. So far, however, no practical form of motor small enough for use in such a model or toy has been developed, nor have any reaction-driven model aircraft yet been produced on a commercial scale.

In a motor for use in a model aircraft or the like, the gases may be generated by igniting a composition inserted in pellet form into a casing, the ignition being effected by producing a temperature of about 200° C., by means either of a fuse or a hot point. In constructing such a motor, lightness of weight is essential and in consequence the strength of the parts is necessarily comparatively low. In particular the casing in which the gas-generating charge is placed and in which it burns must be made as thin-walled as possible. To produce the necessary forward thrust the combustion gases must pass rearwardly through one or more small jet orifices. There is a risk of these becoming clogged and in such a case the gases will be unable to escape and a high pressure will rapidly be developed. This may well lead to bursting of the casing.

An object of this invention is to provide a reaction-driven model aircraft or the like in which the risk of bursting of the casing is eliminated.

Another object is to provide improved reaction motors for model aircraft or the like.

A further object of the invention is to provide a very small reaction motor with means for relieving the internal pressure should this rise above a predetermined value.

The invention is illustrated in the annexed drawings in which—

Figure 1 shows one model aircraft with the preferred form of motor in position;

Figure 2 is a perspective view of the motor;

Figure 3 is a view similar to Figure 2 with parts cut away to show the interior;

Figure 4 is a central longitudinal section through the motor;

Figure 5 shows the same motor in a fixing clip;

Figure 6 shows the same motor furnished with a mounting lug;

Figure 7 shows the same motor in a model speed boat;

Figure 8 is a diagram showing how the motor can be put in a model racing car; and Figure 9 is a longitudinal section through a modified form of motor.

Referring first to Figure 1, a model aircraft 1 is formed with a cylindrical socket 2 which receives a reaction motor 3. The fuselage of the model is slotted on each side, as shown at 4, to provide passages through which air can flow past the outside of the motor in flight for cooling purposes.

The motor 3 is shown in Figures 2 to 4. It comprises a hollow cylindrical casing 5 made of aluminum with a closed front end 6 and an open rear end. The casing receives a solid gas-generating charge 7 in the form of a cylindrical pellet which fits closely inside the cylindrical bore of the casing. An igniting wick 8 is coiled on the end of the charge 7 and a wire gauze disc 9 is placed on the wick, which is led outwards through a gap in the edge of the disc 9.

A removable end cap 10 is built up from a central jet member 11, an outer plate 12, a backing plate 13 and an annular asbestos washer 14 interposed between the outer and backing plates, these components being held together by screwing the jet member into an internally threaded boss 15 on the outer plate 12. The cap 10 is held in position by five wire rods 16 having hook-shaped ends 17 which enter an annular groove 18 in the face of the plate. These rods 16 extend along the outside of the casing 5 and pass through holes 19 in a front plate 20 which has a central opening in which a boss 21 projecting outwards from the end 6 makes a tight fit so that the plate 20 is rigid with the casing 5. At their ends the rods 16 pass through bores in anchorage members 22 and the actual ends are turned round as shown at 23 to lie in sockets 24 in the members 22. Each rod is surrounded by a spring 25 which abuts against the plate 20 and one of the anchorage members 22.

The boss 21 has a threaded bore 26 which can receive the end of a bolt secured in the model aircraft so that the motor can easily be attached to or removed from the aircraft.

By pushing the anchorage members 22 while holding the casing 5, the rods 16 can easily be moved axially to allow the end cap 10 to be removed or put into position. Since the cap extends over the whole diameter of the casing, the insertion of a fresh charge 7 after the removal of the cap is a very simple matter.

The wick 8 is led out through the jet orifice in the member 11. When it is ignited it burns away, leaving the orifice clear, and ignites the charge 7. This then burns, generating gas which builds up to a high pressure in the compression chamber formed between the charge 7 and the cap 10 and escapes at high velocity through the jet orifice, producing a forward thrust on the aircraft by reaction.

The strength of the springs 25 is a matter of importance, as they must hold the cap 10 in its closing position so long as the motor is working satisfactorily but must yield to allow the cap to move rearwardly under abnormal pressure in the casing so that the gases can escape radially between it and the rearward end of the casing. In other words the cap and its mounting constitute a safety device by which the pressure within the casing is relieved if it exceeds a predetermined amount. It is found that satisfactory results are obtained if the springs 25 hold the cap in position under pressure up to about 100–150 lbs. per square inch but allow the cap to move to let the gases escape past it when the pressure rises to about 175 lbs. per square inch.

It is found desirable not to shroud the outlet of the jet orifice in any way. It is partly for this reason that the rods 16 run outside the casing to the forward end in the motor shown in Figures 2 to 4. In addition it is important not to expose the springs to the heat of the escaping gases, as this may cause them to lose their temper, and this is a further reason for making the rods extend forwardly.

An important advantage obtained by constructing the motor in the way shown is that the only screw threads which must be machined are those between the orifice member 11 and the boss 15 and those in the bore 26, and all the parts can be made easily and cheaply. Another advantage is that no part of the safety device can be blown away by excessive pressure, so the motor is suitable for use by boys.

During flight a considerable amount of heat is generated and this has an important bearing on the construction of the casing 5. The charge will burn on attaining a temperature of about 200° C. When it burns the temperature rises rapidly to about 1000° C. It is necessary to prevent the wall of the casing from exceeding 350° C. at any point nearer the end 6 than the burning face of the charge, as otherwise the charge will burn unevenly down the side. The casing wall is therefore made thick enough around the rearward part of the charge to absorb the heat adequately but around the forward part or base of the charge the wall thickness is decreased to reduce the weight, as shown at 27. Alternatively, cooling fins may be made on the outside of the casing.

The motor shown in Figures 2 to 4 may be mounted in an aircraft, vehicle or vessel in other ways. For example, a metal clip 30 may be secured to any suitable part of an aircraft, vehicle or vessel by two screws 31, as shown in Figure 5, and two of the anchorage members 22 may engage in a channel 32 formed by bending the end of the clip, the boss 15 entering a slot 33 in a lug 34 formed by bending up the rearward end of the clip. Again, as shown in Figure 6, a lug 35 can be secured to the boss 21 by a screw 36 and can enter a slot 37 in an aircraft fuselage. Since the motor exerts a reaction thrust, it is enough in some cases simply to fit it into a socket without positively securing it there. For instance Figure 7 shows a model speed boat 38 formed with a socket 39 housing a motor 3. Cooling becomes particularly important in such a case and there must be passages for cooling air between the wall of the socket and the motor and openings at the front of the socket through which air can enter these passages.

In a model racing car the motor 3 can be arranged in a socket above the back axle, as shown diagrammatically in Figure 8.

Many modifications may be made. Thus, as shown in Figure 9, an end cap may be made movable against a spring provided at the rear of the casing. Here the casing $5^1$ is reduced in diameter at the rearward end and formed with an internal flange 40 within which there is an opening 41. This opening is closed by a cap formed by a cup-shaped jet member 42 having a flange 43 which forms an abutment for a spring 44. A tubular member 45 is screw-threaded at one end to fit over the reduced end of the casing $5^1$ and formed with an internal flange 46 at the other end, this flange forming the second abutment for the spring 44. Leakage of gas is prevented by an asbestos washer 47 interposed between the flanges 40 and 43 and compressed by the spring 44. The jet member 42 can move against the spring 44 to relieve the internal pressure and allow the gases to flow past the washer 47 and through the annular space between the members 42 and 45 if the predetermined maximum is exceeded; to allow the gases to escape freely from the annular space holes 48 are made in the flange 46. In this motor the charges cannot be introduced through the opening 41 so the forward end of the casing $5^1$ is formed by a screw-threaded cap 49 which extends over the whole diameter of the casing.

In the motor shown in Figure 9 the internal pressure is applied only to the inner end of the jet member 42, the area of which is less than that of the end cap 10 shown in Figures 2 to 4, so the spring 44 can be comparatively light. This spring is, of course, shrouded from the hot gases by the tubular wall of the member 42.

We claim:

1. A reaction motor of the rocket type adapted for use in a model aircraft, vehicle or vessel, and comprising a casing adapted to receive a gas-generating charge, said casing comprising a member formed with at least one jet orifice having a fixed effective cross section for the discharge of gases generated by the charge, said member being movable relative to the remainder of said casing, and spring means acting on said member and operative to allow said member to move away from the remainder of said casing to allow said gases to escape therebetween upon a predetermined abnormal pressure being attained in said casing but to hold said member in position during normal escape of said gases through said orifice.

2. A reaction motor of the rocket type adapted for use in a model aircraft, vehicle or vessel and comprising a cylindrical casing adapted to receive a cylindrical gas-generating charge having an elongated wick, said casing being closed at its forward end, the rearward end of said casing comprising a cap formed with at least one jet orifice having a fixed effective cross-section for the discharge of gases generated by the charge and adapted to receive said wick, said cap being movable relative to the remainder of said casing, and spring means acting on said cap and operative to hold said cap in position during normal escape of said gases through said orifice but to allow said cap to move rearwardly away from the remainder of said casing to permit said gases to escape therebetween upon a predetermined abnormal pressure being attained in said casing.

3. A reaction motor of the rocket type adapted for use in a model aircraft, vehicle or vessel and comprising a casing adapted to receive a gas-generating charge and closed at its forward end, the rearward end of said casing comprising a cap formed with at least one jet orifice having a fixed effective cross-section for the discharge of gases generated by the charge, said cap being movable relative to the remainder of said casing, and at least one spring acting on said cap disposed outside the path of gases discharged through said orifice and operative to hold said cap in position during normal escape of said gases through said orifice, but to allow said cap to move rearwardly away from the remainder of said casing to permit said gases to escape therebetween upon a predetermined abnormal pressure being attained in said casing.

4. A reaction motor of the rocket type adapted for use in a model aircraft, vehicle or vessel and comprising a casing adapted to receive a gas-generating charge, and closed at its forward end, the rearward end of said casing comprising a cap formed with at least one rearwardly directed jet orifice having a fixed effective cross-section for the escape of gases generated by a charge, said cap being movable away from the remainder of said casing to permit the escape of gases therebetween, a plurality of rods extending outside and parallel to said casing, and a plurality of springs each surrounding one of said rods and operative to urge said rods forwardly, said rods having hook-shaped ends engaging said cap to hold it in position.

5. A reaction motor of the rocket type for use in a model aircraft, vehicle or vessel, and comprising a casing closed at its forward end, a gas generating charge, a cap constituting the rearward end of said casing, said cap being movable relatively to the remainder of said casing, a jet orifice in said cap for the discharge of gases generated by said charge, a wick attached to said charge and extending through said jet orifice, and spring means holding said cap against the remainder of said casing during normal escape of said gases through said orifice, but permitting said cap to move rearwardly away from the remainder of said casing to permit gases to escape therebetween upon a predetermined abnormal pressure being attained in said casing, said spring means being located away from the path taken by the generated gases.

CHARLES M. WILMOT.
JOSEPH N. MANSOUR.

References Cited in the file of this patent
UNITED STATES PATENTS

| Number | Name | Date |
| --- | --- | --- |
| 607,548 | Pinkert | July 19, 1898 |
| 1,324,607 | Maclean | Dec. 9, 1919 |
| 2,400,242 | Malina et al. | May 14, 1946 |
| 2,402,809 | Farr | June 25, 1946 |
| 2,422,721 | Farr | June 24, 1947 |
| 2,460,289 | Hickman | Feb. 1, 1949 |
| 2,470,162 | Goehmann | May 17, 1949 |
| 2,489,953 | Burney | Nov. 29, 1949 |
| 2,552,497 | Roach et al. | May 8, 1951 |